(12) United States Patent
Gowda et al.

(10) Patent No.: US 12,403,924 B2
(45) Date of Patent: Sep. 2, 2025

(54) SYSTEMS AND METHODS FOR RESPONDING TO AUDIBLE COMMANDS AND/OR ADJUSTING VEHICLE COMPONENTS BASED THEREON

(71) Applicant: Nissan North America, Inc., Franklin, TN (US)

(72) Inventors: Nikhil Gowda, San Francisco, CA (US); Stefan Witwicki, San Carlos, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 678 days.

(21) Appl. No.: 17/390,778

(22) Filed: Jul. 30, 2021

(65) Prior Publication Data

US 2023/0035752 A1 Feb. 2, 2023

(51) Int. Cl.
| | | |
|---|---|---|
| *B60W 50/10* | (2012.01) | |
| *B60R 16/037* | (2006.01) | |
| *B60W 50/08* | (2020.01) | |
| *G10L 15/22* | (2006.01) | |

(52) U.S. Cl.
CPC ......... *B60W 50/10* (2013.01); *B60R 16/0373* (2013.01); *B60W 50/085* (2013.01); *G10L 15/22* (2013.01); *B60W 2540/21* (2020.02); *G10L 2015/223* (2013.01)

(58) Field of Classification Search
CPC .............. B60W 50/10; B60W 50/085; B60W 2540/21; B60R 16/0373; G10L 15/22; G10L 2015/223; G10L 15/08; G10L 2015/228
See application file for complete search history.

(56) References Cited

U.S. PATENT DOCUMENTS

| | | | | |
|---|---|---|---|---|
| 7,899,671 B2 * | 3/2011 | Cooper | ................. | G10L 15/065 704/251 |
| 10,475,447 B2 * | 11/2019 | Ji | ........................... | G10L 15/183 |
| 11,211,058 B1 * | 12/2021 | Eakin | .................... | G10L 15/197 |
| 11,590,929 B2 * | 2/2023 | Bhattacharya | ....... | G05B 13/027 |
| 2008/0091426 A1 * | 4/2008 | Rempel | ............... | G10L 15/1822 704/E15.044 |
| 2013/0185072 A1 * | 7/2013 | Huang | .................... | G10L 25/72 704/246 |

(Continued)

*Primary Examiner* — Anne Marie Antonucci
*Assistant Examiner* — Misa H Nguyen
(74) *Attorney, Agent, or Firm* — Global IP Counselors, LLP (57) ABSTRACT

Systems and methods for adjusting vehicle components based on audible commands are disclosed herein. In an embodiment, the system includes a plurality of adjustable vehicle components, an audio device, and a controller. The audio device is configured to receive an audible command and generate corresponding command data. The controller is programmed to generate at least one confidence score based on the command data and (i) cause a first response to be output from the audio device after determining that the at least one confidence score does not meet a first threshold, (ii) cause a second response to be output from the audio device after determining that the at least one confidence score does not meet a second threshold, and (iii) cause an adjustment of at least one adjustable vehicle component after determining that the at least one confidence score meets the second threshold.

20 Claims, 3 Drawing Sheets

(56) References Cited

U.S. PATENT DOCUMENTS

2013/0185078 A1\* 7/2013 Tzirkel-Hancock .... G10L 15/22
704/E11.001
2020/0005778 A1\* 1/2020 Kim ........................ G10L 15/30

\* cited by examiner

SYSTEMS AND METHODS FOR RESPONDING TO AUDIBLE COMMANDS AND/OR ADJUSTING VEHICLE COMPONENTS BASED THEREON

BACKGROUND

Technical Field

The present disclosure generally relates to systems and methods of responding to audible commands and/or adjusting vehicle components. More specifically, the present disclosure relates to systems and methods of adjusting vehicle components based on audible commands received within a vehicle.

Background Information

Some vehicles include an in-cabin voice user interface which receives and attempts to interpret audible commands from the driver. However, when the in-cabin voice user interface is unable to interpret an audible command, the driver does not understand why. If the in-cabin voice user interface responds with an open class repair initiator such as "I didn't get that," the driver is not provided with any information to correct the audible command.

SUMMARY

It has been discovered that it is advantageous to provide a vehicle occupant with feedback regarding why an audible command cannot be processed. The present disclosure provides systems and methods which are configured to determine the problem with an audible command and provide the speaker a response which helps the speaker provide another audible command that is accurately processed. The systems and methods disclosed herein thus reduce confusion in voice interaction, particularly when there is an error (e.g., an ASR or NLU error), by instructing the speaker as to what corrective measures to take in a follow-up audible command. The present disclosure also provides systems and methods which use the surrounding context of the vehicle to help interpret the type of error. In doing so, the present disclosure allows for clarity for the user in picking the right dialog repair strategy.

In view of the state of the known technology, one aspect of the present disclosure is to provide a system for adjusting vehicle components based on audible commands received within a vehicle. The system includes a plurality of adjustable vehicle components, an audio device, and a controller. The audio device is configured to receive an audible command from an occupant within the vehicle and generate corresponding command data. The controller is programmed to generate at least one confidence score based on the command data. The controller is further programmed to (i) cause a first response to be output from the audio device after determining that the at least one confidence score does not meet a first threshold, (ii) cause a second response to be output from the audio device after determining that the at least one confidence score does not meet a second threshold, the second response different from the first response, and (iii) cause an adjustment of at least one adjustable vehicle component of the plurality of adjustable vehicle components after determining that the at least one confidence score meets the second threshold.

A second aspect of the present disclosure is to provide a system for adjusting vehicle components based on audible commands received within a vehicle. The system includes a plurality of adjustable vehicle components, an audio device, and a controller. The audio device is configured to receive an audible command from an occupant within the vehicle and generate corresponding command data. The controller is programmed to (i) access context data relating to a current state of the vehicle, (ii) determine correspondence between the audible command and at least one adjustable vehicle component of the plurality of adjustable vehicle components using the command data and the context data, and (iii) cause an adjustment of the at least one adjustable vehicle component corresponding to the audible command.

A third aspect of the present disclosure is to provide a system for adjusting vehicle components based on audible commands received within a vehicle. The system includes a plurality of adjustable vehicle components, an audio device, and a controller. The audio device is configured to receive an audible command from an occupant within the vehicle and generate corresponding command data. The controller is programmed to receive context data relating to a current state of the vehicle and determine correspondence between the context data and at least a portion of the command data. The controller is further configured to (i) cause a first response to be output from the audio device after determining that the context data does not correspond to at least a portion of the command data, (ii) cause a second response to be output from the audio device after determining that the context data corresponds to at least a portion of the command data but a threshold is not met, and (iii) cause an adjustment of at least one adjustable vehicle component of the plurality of adjustable vehicle components after determining that the context data corresponds to at least a portion of the command data and the threshold is met.

A fourth aspect of the present disclosure is to provide methods corresponding to the systems described herein.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
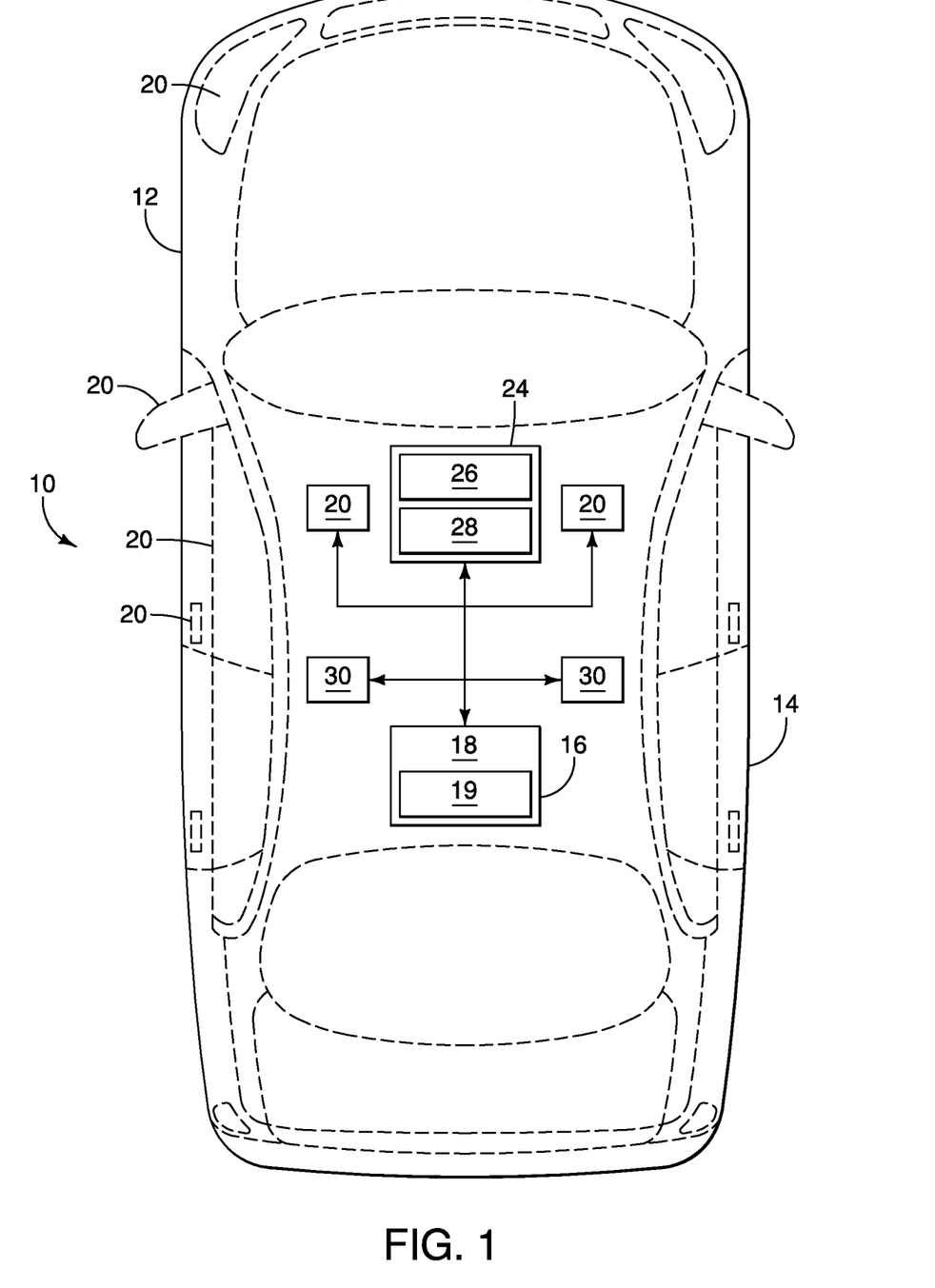
FIG. 1 illustrates a schematic diagram of an example embodiment of a system for adjusting vehicle components based on audible commands received within a vehicle in accordance with the present disclosure.

Referring initially to FIG. 1, a system 10 for adjusting vehicle components based on audible commands received within a vehicle 12 is illustrated in accordance with a first embodiment. In the illustrated embodiment, the system 10 includes a vehicle 12 having a vehicle body 14 and a controller 16. Alternatively, the system 10 can include the controller 16 and/or other components discussed herein and be separate from and in communication with one or more components of the vehicle 12.

In an embodiment, the controller 16 includes at least one processor 18 and at least one memory 19. The controller 16 preferably includes a microcomputer with a vehicle component control program that controls a plurality of adjustable vehicle components 20 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control and/or access data from one or more vehicle component 20, one or more audio device 24 and/or one or more sensor 30 as discussed herein. The memory circuit stores processing results and control programs such as ones for vehicle component control operations that are run by the processor circuit. The controller 16 is operatively coupled to the vehicle body 14 in a conventional manner. The internal RAM of the controller 16 stores statuses of operational flags and various control data. The internal ROM of the controller 16 stores the instructions for various operations. The controller 16 is capable of selectively controlling any of the components of the vehicle 12 in accordance with the control program.

The vehicle 12 includes at least one adjustable vehicle component 20. The at least one adjustable vehicle component 20 can include any vehicle component that is capable of being adjusted based on instructions from the controller 16. The adjustment can include at least one of a mechanical adjustment, a volume level adjustment, a temperature adjustment, a route adjustment, or any other adjustment caused by instructions generated by the controller 16. The adjustment can be to change at least one adjustable vehicle component 20 from a current configuration to a new configuration. The new configuration can be a preset configuration. The controller 16 is configured to cause adjustment to the at least one adjustable vehicle component 20 by directly controlling the at least one adjustable vehicle component 20 according to the instructions and/or by sending the instructions to a separate controller of the at least one adjustable vehicle component 20.

In an embodiment, the vehicle 12 includes a plurality of adjustable vehicle components 20. In an embodiment, the plurality of adjustable vehicle components 20 are each configured to be adjusted in response to at least one audible command. As explained in more detail below, the controller 16 is programmed to correlate command data with an adjustable vehicle component 20 of a plurality of adjustable vehicle components 20 and cause an adjustment to the correlated adjustable vehicle component 20.

In an embodiment, the at least one adjustable vehicle component 20 includes a vehicle seat. The vehicle seat can be a driver's seat or passenger's seat within the vehicle 12. The adjustment can be a mechanical adjustment of the seat position. The mechanical adjustment can be to change the vehicle seat position to a different configuration. The controller 16 is configured to cause the adjustment by causing the vehicle seat to move from a current configuration to the different configuration. The adjustment can also be a temperature adjustment of the vehicle seat. The temperature adjustment can be to control a seat heater to raise or lower a temperature of the vehicle seat. In an embodiment, the adjustment can both change the physical orientation of the vehicle seat and change the temperature of the vehicle seat. Those of ordinary skill in the art will recognize from this disclosure that there are various ways to adjust a vehicle seat in accordance with the methods discussed herein.

In an embodiment, the at least one adjustable vehicle component 20 includes a window. The adjustment can be a mechanical adjustment of the window. The mechanical adjustment can be to open or close the window. The mechanical adjustment can be to move the window up or down. The mechanical adjustment can be to move the window to a predetermined configuration. Those of ordinary skill in the art will recognize from this disclosure that there are various ways to adjust a window in accordance with the methods discussed herein.

In an embodiment, the at least one adjustable vehicle component 20 includes a windshield wiper system. The adjustment can be a mechanical adjustment of the windshield wiper system. The mechanical adjustment can be to turn the windshield wipers on or off. The mechanical adjustment can be to adjust a speed or frequency of the windshield wipers. The mechanical adjustment can be to adjust the speed or frequency of the windshield wipers to a predetermined configuration. The mechanical adjustment can be to eject fluid by the windshield wiper system. Those of ordinary skill in the art will recognize from this disclosure that there are various ways to adjust a windshield wiper system in accordance with the methods discussed herein.

In an embodiment, the at least one adjustable vehicle component 20 includes a volume control device. The adjustment can be a volume level adjustment of the volume control device. The volume level adjustment can be to turn the volume control device on or off. The volume level adjustment can be to adjust a volume level (e.g., make the volume louder or quieter). The volume level adjustment can be to adjust the volume level to a predetermined configuration. Those of ordinary skill in the art will recognize from this disclosure that there are various ways to adjust a volume control device in accordance with the methods discussed herein.

In an embodiment, the at least one adjustable vehicle component 20 includes a drive system. The adjustment can be a mechanical adjustment of the drive system. The mechanical adjustment can be to adjust the drive system to a different drive mode. The drive mode can include a two-wheel drive mode, a four-wheel drive mode, an all-wheel drive mode, a snow mode, a sport mode, a sand/mud mode, and/or another drive mode. The mechanical adjustment can be to increase or decrease a speed of the vehicle 12. Those of ordinary skill in the art will recognize from this disclosure that there are various ways to adjust a drive system in accordance with the methods discussed herein.

In an embodiment, the at least one adjustable vehicle component 20 includes a lock. The adjustment can be a mechanical adjustment of the lock. The adjustment can be to lock or unlock the lock. The adjustment can be to activate or deactivate a child-safety lock. Those of ordinary skill in the art will recognize from this disclosure that there are various ways to adjust a lock in accordance with the methods discussed herein.

In an embodiment, the at least one adjustable vehicle component 20 includes a temperature control system within the vehicle 12. The temperature control system can include, for example, an in-vehicle heating or cooling unit, a seat heater, or another type of heating or cooling device. The adjustment can be a temperature adjustment of the temperature control system. The temperature adjustment can be to turn the temperature control system on or off. The temperature adjustment can be to raise or lower a temperature. The temperature adjustment can be to raise or lower a temperature to a predetermined temperature. The adjustment can also be a mechanical adjustment. The mechanical adjustment can be, for example, to adjust a fan or other mechanical element of the temperature control system. Those of ordinary skill in the art will recognize from this disclosure that there are various ways to adjust a temperature control system in accordance with the methods discussed herein.

In an embodiment, the at least one adjustable vehicle component 20 includes a navigation system. The adjustment can be route adjustment. The route adjustment can be to change a navigation route for the vehicle 12. The route adjustment can be to change a destination address. Those of ordinary skill in the art will recognize from this disclosure that there are various ways to adjust a navigation system in accordance with the methods discussed herein.

The above adjustable vehicle components 20 are just a few examples of adjustable vehicle components 20 which can be adjusted based on instructions from the controller 16. The above adjustments are just a few examples of adjustments which can be caused based on instructions from the controller 16. Those of ordinary skill in the art will recognize from this disclosure that there are also other vehicle components 20 which are advantageous to include in the systems and methods discussed herein and/or adjustments which can be made using the systems and methods discussed herein.

The vehicle 12 includes an audio device 24. The audio device 24 is configured to receive an audible command from an occupant of the vehicle 12. The occupant can be a driver or passenger. The audio device 24 can also serve other functions within the vehicle 12, for example, can also be used by a navigation system, an in-vehicle entertainment unit, or another vehicle component. In an embodiment, the vehicle 12 includes multiple audio devices 24. The audio device 24 can also be a vehicle component 20 which is controlled by the controller 16 in accordance with the present disclosure. For example, in an embodiment, the controller 16 is configured to adjust a volume of the audio device 24 in response to an audible command received from an occupant of the vehicle 12.

The audio device 24 includes a microphone 26. The microphone 26 is configured to receive the audible command from the occupant of the vehicle 12. The audio device 24 also includes a speaker 28 configured to provide an audible response to the occupant. In an embodiment, the microphone 26 and the speaker 28 are located together on the same unit. Alternatively, the microphone 26 and speaker 28 can be located separately. In an embodiment, the audio device 24 can include multiple microphones 26 and/or multiple speakers 28 located at different locations within the vehicle 12.

The audio device 24 is configured to generate command data based on an audible command. In an embodiment, the command data represents the audible command received by the audio device 24. In an embodiment, each distinct audible command received by the audio device 24 results in the generation of distinct command data. In an embodiment, the command data includes an automatic speech recognition (ASR) output and/or a natural language understanding (NLU) output and/or is used to generate an ASR output and/or an NLU output.

As described in more detail below, the controller 16 is configured to generate at least one confidence score based on the command data. In an embodiment, the at least one confidence score includes a first confidence score and a second confidence score. As explained in more detail below with respect to the method 100, the controller 16 is configured to generate and/or use one or both of the first confidence score and/or the second confidence score depending on whether one or more threshold is met and/or a domain match is made. In an alternative embodiment, the method 100 can be performed without at least one confidence score. In an embodiment, the controller 16 is configured to generate at least one confidence score based on the command data and context data, as explained in more detail below.

In the illustrated embodiment, the vehicle 12 includes at least one sensor 30. The at least one sensor 30 is configured to generate context data. The context data relates to a current state of the vehicle 12. In an embodiment, the context data includes at least one of (i) vehicle component data relating to a current state of at least one adjustable vehicle component 20 of the plurality of adjustable vehicle components 20, (ii) occupant data relating to a current state of one or more occupant of the vehicle 12, (iii) weather data relating to a current state of weather, (iv) traffic data relating to a current state of traffic, and/or (v) road data relating to a current state of one or more road. Those of ordinary skill in the art will recognize from this disclosure that there are also other types of context data capable of detection by a sensor 30. A sensor 30 can be located inside or outside of the vehicle 12. As should be understood by those of ordinary skill in the art from this disclosure, the location and type of sensor 30 will typically depend on the type of context data being gathered.

In an embodiment, the at least one sensor 30 is configured to generate vehicle component data relating to a current state of at least one adjustable vehicle component 20 of the plurality of adjustable vehicle components 20. In an embodiment, the at least one sensor 30 includes, for example, a sensor which detects a current state such as an ON/OFF state, a mechanical/positional configuration, a volume level, a temperature, a route, or any other detectable state of an adjustable vehicle component 20. In an embodiment, a sensor 30 is configured to detect that the current state of an adjustable vehicle component 20 is one of a plurality of different configurations. Those of ordinary skill in the art will recognize from this disclosure that there are various types of sensors 30 which detect component-related information.

In an embodiment, the at least one sensor 30 is configured to generate occupant data relating to a current state of one or more occupant of the vehicle 12. In an embodiment, the at least one sensor 30 includes, for example, a sensor which detects a user's line of sight, head position, body language, or other occupant data. In an embodiment, a sensor 30 includes one or more image sensor configured to record context data related to an occupant of the vehicle 12. In an embodiment, an image sensor includes a camera configured to record one or more image of the occupant of the vehicle 12. The image can include still images or video. In an embodiment, an image sensor is located at or near the dashboard of the vehicle 12 and is focused rearward toward an occupant to capture the front side of the occupant's head. The image sensor can also be located at other locations and/or capture the occupant from other angles. In an embodiment, the controller 16 is configured to use occupant data from such an image sensor to generate context data related to the occupant's line of sight, head position, or body language. Those of ordinary skill in the art will recognize from this disclosure that there are various types of sensors 30 which detect occupant-related information.

In an embodiment, the at least one sensor 30 is configured to generate weather data relating to a current state of weather. In an embodiment, the at least one sensor 30 includes a moisture sensor which detects moisture outside of the vehicle 12 (e.g., which detects rain or snow). In an embodiment, the at least one sensor 30 includes a temperature sensor which detects the temperature outside of the vehicle 12. In an embodiment, the at least one sensor 30 includes a temperature sensor which detects the temperature inside of the vehicle 12. In an embodiment, the at least one sensor 30 includes a noise sensor which detects the wind noise outside of or coming into the vehicle 12. Those of ordinary skill in the art will recognize from this disclosure that there are various types of sensors 30 which detect weather-related information.

In an embodiment, the at least one sensor 30 is configured to generate traffic data relating to a current state of traffic. In an embodiment, the at least one sensor 30 includes a proximity sensor or image sensor which detects other cars in a vicinity of the vehicle 12 and/or which detects traffic signals. In an embodiment, an image sensor includes a camera configured to record one or more image outside of the vehicle 12, and the controller 16 is programmed to determine a traffic situation using the image, for example, using size and/or shape recognition to determine the presence of other vehicles, traffic signs and signals, or other traffic-related objects. Those of ordinary skill in the art will recognize from this disclosure that there are various types of sensors 30 which detect traffic-related information.

In an embodiment, the at least one sensor 30 is configured to generate road data relating to a current state of one or more road. In an embodiment, the at least one sensor 30 includes a sensor which detects a roughness of the road surface. In an embodiment, the at least one sensor 30 includes a sensor which detects a type of road surface (e.g., sand, gravel, mud, asphalt, concrete, etc.). In an embodiment, the at least one sensor 30 includes a sensor which detects a road condition (e.g., a slick surface due to rain, snow, etc.). Those of ordinary skill in the art will recognize from this disclosure that there are various types of sensors 30 which detect road-related information.

In an embodiment, the controller 16 is programmed to access context data relating to the current state of the vehicle 12 and use the context data for generation of at least one confidence score as discussed herein. In an embodiment, a first confidence score is generated using the command data and not the context data, and a second confidence score is generated using the command data and the context data. In an embodiment, the controller 16 generates the second confidence score when the context data corresponds to at least a portion of the command data. In an embodiment, the controller 16 does not generate the second confidence score when accessed context data does not correspond to at least a portion of received command data.

Figure 2:
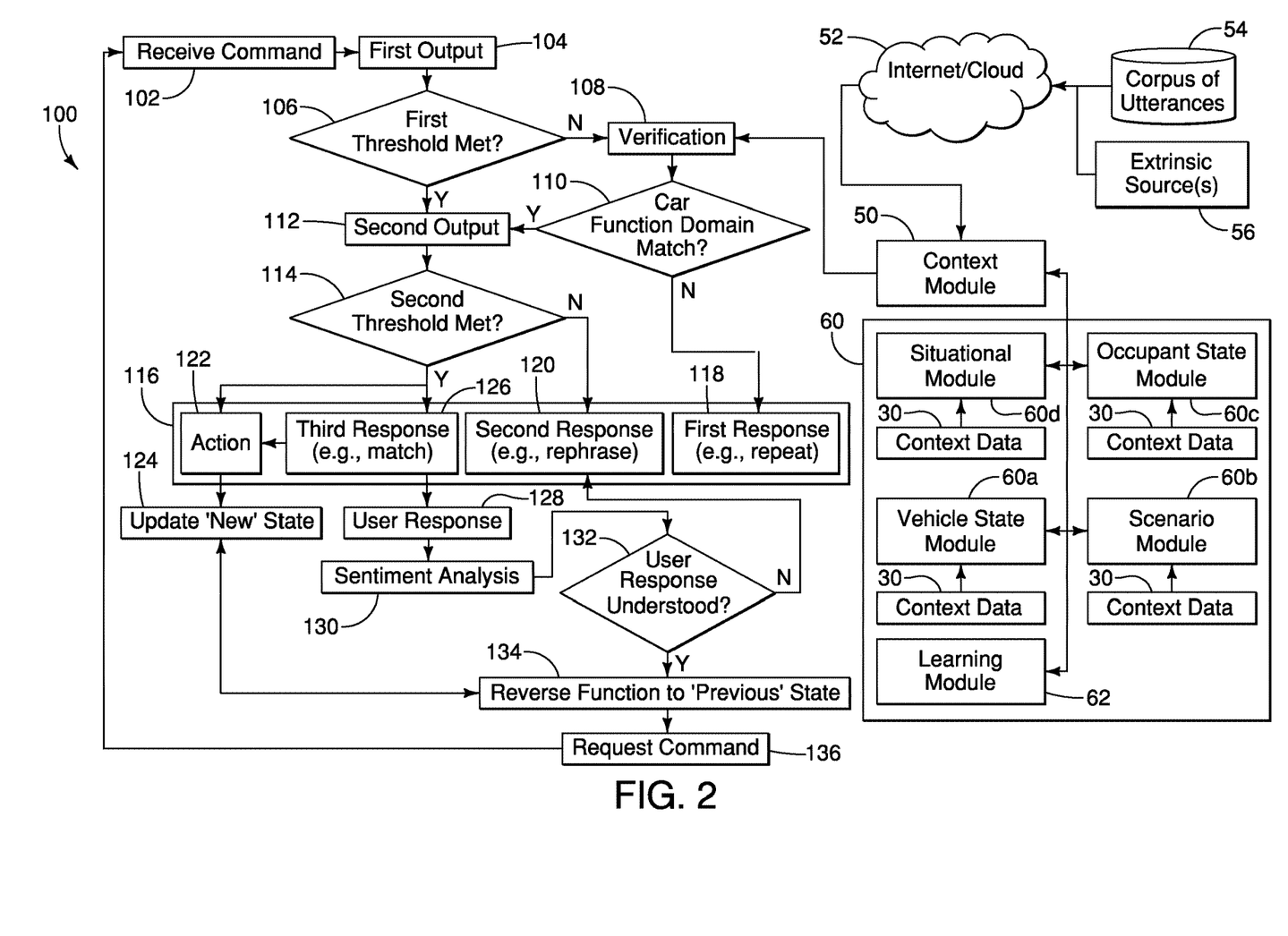
FIG. 2 illustrates an example embodiment of a method of adjusting vehicle components based on audible commands received within a vehicle in accordance with the present disclosure which can be implemented using the system of FIG. 1.

FIG. 2 illustrates an example embodiment of a method 100 of adjusting vehicle components based on audible commands received within a vehicle 12. Some or all of the steps of the method 100 can be stored as instructions on at least one memory 19 of the controller 16 and executed by at least one processor 18 of the controller 16. Some or all of the steps of the method 100 can also be stored as instructions on an adjustable vehicle component 20, audio device 24 and/or sensor(s) 30 and executed by a processor of the adjustable vehicle component 20, audio device 24 and/or sensor(s) 30. It should be understood from this disclosure that some of the steps described herein can be reordered or omitted without departing from the spirit or scope of the method 100.

As seen in FIG. 2, the controller 16 includes a context module 50. The controller 16 is configured to receive context data into the context module 50. In an embodiment, the context module 50 enhances the context data by determining one or more specific situation associated with the context data. The context module 50 further includes processing instructions for receiving and processing context data, as will be discussed in more detail below.

In the illustrated embodiment, the controller 16 is configured to access context data from one or more remote source. Specifically, the controller 16 is configured to access context data from a remote source via a wireless network 52. Here, the remote source includes a corpus of utterances 52 and/or one or more extrinsic source 54. In an embodiment, the corpus of utterances 52 includes a database of phrases which are alternatives to possible audible commands received by the audio device 24. In an embodiment, the corpus of utterances 52 includes a database of phrases which correspond to specific situations associated with the context data. In an embodiment, the one or more extrinsic source 54 includes, for example, a weather database with weather data related to the weather in the area of the vehicle 12 as discussed herein, a traffic database with traffic data related to traffic in the area of the vehicle 12 as discussed herein, and/or a road condition database with road data related to road conditions in the area of the vehicle 12 as discussed herein. In an embodiment, the context module 50 receives context data from the one or more extrinsic source 54.

In the illustrated embodiment, the controller 16 is configured to access context data from one or more state module 60 stored locally in at least one memory 19. The state modules 60 process context data from one or more sensor 30. In an embodiment, a state module 60 includes one or more of a vehicle state module 60a, a scenario module 60b, an occupant state module 60c, a situational module 60d, and/or another module which processes context data. In an embodiment, each state module 60 includes processing instructions for receiving and processing context data from one or more respective sensor 30. In an embodiment, one or more module 60 can be accessed wirelessly via the network 52 instead of via a local memory 19.

The vehicle state module 60a is configured to process context data related to a current state of one or more adjustable vehicle components 20. In an embodiment, the vehicle state module 60a is configured to process vehicle component data relating to a current state of at least one adjustable vehicle component 20 of the plurality of adjustable vehicle components 20. For example, in various embodiments, the vehicle state module 60a is configured to process context data from one or more sensor 30 to determine whether one or more adjustable vehicle component 20 is on or off. In various embodiments, the vehicle state module 60a is configured to process context data from one or more sensor 30 to determine a mechanical configuration, a volume level, a temperature, a route, or any other detectable state of an adjustable vehicle component 20. In an embodiment, the vehicle state module 60a is configured to process context data from one or more sensor 30 to detect that the current state of an adjustable vehicle component 20 is one of a plurality of different configurations.

The scenario module 60b is configured to process context data related to a current scenario of the vehicle 12. The scenario can be, for example, a weather-related scenario (e.g., that the vehicle 12 is experiencing rain, high winds, humid weather, etc.). In an embodiment, the scenario module 60b is configured to process weather data relating to a current state of weather as discussed herein. In various embodiments, the scenario module 60b is configured to process context data from one or more sensor 30 to determine a temperature outside the vehicle 12. In various embodiments, the scenario module 60b is configured to process context data from one or more sensor 30 to determine a temperature inside the vehicle 12. In an embodiment, the scenario module 60b is configured to process context data related to a non-weather related scenario. For example, in an embodiment, the scenario module 60b is configured to process context data related to the number of passengers in the vehicle and/or which seats/locations within the vehicle 12 are currently being used by an occupant (e.g., using a seat sensor which detects an occupant sitting in the seat). In an embodiment, the scenario module 60b is configured to process road data relating to a current state of one or more road as discussed herein. In an embodiment, the scenario module 60b is configured to process traffic data relating to a current state of traffic as discussed herein.

The occupant state module 60c is configured to process context data related to the current occupant of the vehicle 12. The occupant can be a driver or passenger. In an embodiment, the occupant state module 60c is configured to process occupant data relating to a current state of one or more occupant of the vehicle 12 as discussed herein. For example, in an embodiment, the occupant state module 60c is configured to process context data regarding an occupant who speaks an audible command being processed by the controller 16. The occupant data can include, for example, an occupant's line of sight, head position, body language, whether the occupant is yawning or covering his or her mouth when speaking, or other occupant data.

In an embodiment, the context data related to the current occupant of the vehicle 12 includes data from an image taken of the current occupant by an image sensor 30. From the image, the occupant state module 60c is configured to detect conditions such as the occupant's line of sight and/or head position based on eye and/or head direction. The occupant state module 60c is configured to detect conditions such as whether the occupant is yawning or covering his or her mouth while speaking using image recognition processing. The occupant state module 60c can also detect conditions such as facial expressions using image recognition processing. The image recognition processing can be performed, for example, via a neural network.

The situational module 60d is configured to process context data related to a current situation relating to traffic or other obstacles surrounding the vehicle 12. In an embodiment, the situational module 60d is configured to process traffic data relating to a current state of traffic as discussed herein. In an embodiment, the context data processed by the situational module 60d includes one or more of a vehicle classifier, a vehicle direction, the traffic density, road features, weather, and/or other data. In an embodiment, the situational module 60d is configured to process context data to determine one or more of an impact of the vehicle class, an impact of the vehicle direction, an impact of traffic density, an impact of turning or otherwise changing direction, or another impact. In various embodiments, the situational module 60d is configured to process one or more of vehicle component data, weather data, traffic data and/or road data as discussed herein.

In an embodiment, the situational module 60d includes a MODIA (multiple online decision-components with interacting actions) model. Such a model can be configured to provide intelligent driving assist technology that aids the driver of a vehicle with navigation in real-time, for example, using various sensors in combination with a navigation system such as a global positioning system.

In an embodiment, the controller 16 includes a learning module 62. The learning module 62 is configured to learn from the context module 50 processing audible commands that are received from an occupant. For example, each time the controller 16 associates a new audible command from an occupant with a specific adjustment of a vehicle component 20, the learning module 62 is configured to store that new audible command so that it is understood the next time it is spoken by an occupant. In an embodiment, the learning module 62 can be used to update the corpus of utterances 54 as new audible commands are correlated with adjustments and/or adjustable vehicle components 20.

At step 102 of the method 100, the audio device 24 receives an audible command. Specifically, the microphone 26 of the audio device 24 receives the audible command. The audible command includes an instruction from an occupant of the vehicle 12 to adjust at least one adjustable vehicle component 20. In an embodiment, one or more vehicle component 20 is in a current configuration during step 102.

The audio device 24 generates command data based on the audible command. In an embodiment, the command data includes data sufficient to allow the controller 16 to generate at least one output corresponding to the audible command. In an embodiment, the at least one output includes a first output and a second output. In an embodiment, the command data includes data sufficient to allow the controller 16 to generate an ASR output and/or an NLU output. In an embodiment, the command data includes an ASR output and/or an NLU output.

At step 104, the controller 16 processes the command data. Specifically, the controller processes a first output from the command data. In an embodiment, the controller 16 generates the first output based on the command data. In the illustrated embodiment, the first output includes an ASR output corresponding to the audible command received by the audio device 24 at step 102.

At step 106, the controller 16 processes the command data to determine whether a first threshold has been met. More specifically, the controller 16 determines whether the first threshold has been met by the first output. In an embodiment, the first threshold is met when the controller 16 recognizes at least one word from the first output. In an embodiment, the first threshold is met when the controller recognizes at least one word from the first output which corresponds to a predetermined group of words. In another embodiment, the first threshold is met when the controller 16 recognizes a predetermined number of a plurality of words of the first output (e.g., from a predetermined group of words). In an embodiment, the controller 16 is configured to generate at least one confidence score (e.g., a first confidence score) based on the first output. In an embodiment, the first confidence score is based on a number of recognized words in the first output. In an embodiment, the first confidence score is based on a type of recognized word in the first output. In an embodiment, the first confidence score is based on missing words in the first output. In an embodiment, the first confidence score includes a first numerical value and the first threshold includes a second numerical value, and the controller 16 is configured to determine that the first threshold has been met if the first numerical value is above or below the second numerical value. In an embodiment, the first confidence score is generated based on the controller 16 recognizing one word from the first output (e.g., from a predetermined group of words). In an embodiment, the first confidence score is generated based on the controller 16 recognizing particular words or a particular order of words from the first output. In an embodiment, the first confidence score includes an error probability determination. In an embodiment, the first threshold is met if the first confidence score is within a standard deviation of the first threshold (e.g., one standard deviation as determined by user studies). If the first output does not meet the first threshold, the method 100 proceeds to step 108. If the first output meets the first threshold, the method 100 proceeds to step 112.

At step 108, the controller 16 accesses context data relating to a current state of the vehicle 12. Specifically, the controller 16 accesses the context module 50 to process context data that has been enhanced by the context module 50 to indicate one or more particular contextual scenario. The controller 16, via the context module 50, is configured to determine one or more contextual scenario based on the context data. In an embodiment, the controller 16 is configured to determine to a current state of one or more adjustable vehicle components 20 as discussed herein. In an embodiment, the controller 16 is configured to determine a current scenario of the vehicle 12 as discussed herein. In an embodiment, the controller 16 is configured to determine a current state of the occupant who spoke the audible command as discussed herein. In an embodiment, the controller 16 is configured to determine a current situation relating to traffic or other obstacles surrounding the vehicle 12 as discussed herein.

In an embodiment, the controller 16 accesses context data related to one or more word recognized from the command data (e.g., from the first output of the command data). In an embodiment, if the controller 16 recognizes a word related to an adjustable vehicle component 20, the controller 16 is configured to retrieve context data related to a current state of that adjustable vehicle component 20 and/or context data related to the function of that adjustable vehicle component 20. For example, if the controller 16 recognizes the word "seat" in the command data, the controller 16 is configured to retrieve vehicle component data related to the current state of the vehicle seats in the vehicle 12. In another example, if the controller 16 recognizes a word such as "window" or "wiper", the controller 16 is configured to retrieve context data related to the current state of a window or windshield wiper along with weather data relating to a current state of weather which could affect whether it is desirable to have a window opened or closed or a windshield wiper on or off. In another example, if the controller 16 recognizes a word such as "drive", the controller 16 is configured to retrieve context data related the current state of a drive system along with road data relating to a current state of the road which could affect whether a particular drive system is desirable. In another example, if the controller 16 recognizes a word such as "temperature", "heat" or "cool", the controller 16 is configured to retrieve context data related the current state of a temperature control system along with weather data relating to a current state of weather. In another example, if the controller 16 recognizes a word such as "route", the controller 16 is configured to retrieve context data related the current state of a navigation system along with traffic data or road data relating to a current state of traffic or the road which could affect whether a particular route is desirable.

In an embodiment, the context module 50 includes a predetermined list of functions which correspond to particular words which may be included in an audible response. At step 108, the controller 16 retrieves context data related to those functions (e.g., weather control, navigation control, mechanical control, etc.) For example, if the controller 16 recognizes a word such as "window" or "wiper", the controller determines from the predetermined list of functions to retrieve context data related to weather conditions which may affect whether the occupant desires to adjust a window or windshield wiper. Thus, in an embodiment, the controller 16 narrows the list of functions based on words detected in the audible command. The controller 16 can then retrieve context data related to those functions. In an embodiment, the predetermined list of functions indicate which one or more state module 60 should be accessed for context data related to the audible command.

At step 110, the controller 16 determines correspondence between the audible command and at least one adjustable vehicle component 20 of the plurality of adjustable vehicle components 20 using the command data and the context data. Specifically, the controller determines correspondence between the context data and at least a portion of the command data. The portion of the command data can include one or more word from the first output. In an embodiment, the controller 16 performs a car function domain matching process. During the car function domain matching process, the controller 16 matches the function of an adjustable vehicle component 20 interpreted from the command data to context data related to the function (e.g., weather control, navigation control, mechanical control, etc.). If a sufficient car function domain match is found, the method 100 proceeds to step 112. If no sufficient car function domain match is found, or if a possible match does not meet a threshold, the method 100 proceeds to step 118.

Those of ordinary skill in the art will recognize from this disclosure that there are various ways to perform a car function domain matching process. As discussed above, one example method is for the context module 50 to include a predetermined list of functions which correspond to particular words which may be included in an audible response. For example, if the command data includes the words "window" and "up", the controller 16 retrieves weather data regarding the temperature inside and/or outside the vehicle 12 to determine whether an extreme temperature outside or a weather condition such as rain supports the need for windows to be rolled up. If vehicle component data further indicates that the windows are rolled down in their current state, this also further supports the occupant asking for the windows to be rolled up. For another example, if the controller 16 recognizes the words "adjust" and "route", the controller 16 is configured to retrieve traffic data and/or road data to determine whether upcoming conditions support the need for a route change.

As an example, an emergency vehicle driving in the same lane as the vehicle 12 may cause the driver to require a volume adjustment of an in-vehicle system or a window adjustment to decrease the noise. The context module 50 is configured to generate context data corresponding to the emergency vehicle, for example, by detecting the siren of the emergency vehicle or other traffic data related to the emergency vehicle's presence. This context data increases the domain match efficiency as there is shorter list of functions that are attributable to the scenario, such as volume control, window state, and hazards. Thus, the detection of a word in the audible command which relates to these functions, along with the context data related to the emergency vehicle, can be used by the context module 50 to determine correspondence with the function of an adjustable vehicle component 20 with a higher degree of accuracy than otherwise possible. Thus, for example, when the controller 16 determines that the first threshold is not met, the controller 16 is configured to use bits of information from the first output at step 108 to narrow the possible audible commands being requested based on function related to the current scenario (e.g., volume control, hazards, and window control in this scenario).

In an embodiment, the context data can indicate that an occupant behavior caused the first output to not meet the first threshold. For example, the occupant state module 60c can be configured to detect if the occupant covered his or her mouth or yawned while speaking the audible command as discussed herein. In this case, the method 100 at step 108 can use this occupant data to attribute the failure to meet the first threshold at step 106 as being caused by the occupant's mouth covering or yawn due to mispronunciation of an audible command that is likely correct. Thus, in an embodiment, the controller 16 proceeds to step 118 upon determining that an occupant behavior (e.g., a yawn) occurred during speaking of the audible command.

At step 112, the controller 16 processes the command data. Specifically, the controller 16 generates and/or processes a second output from the command data. In the illustrated embodiment, the second output includes an NLU output corresponding to the audible command received by the audio device 24 at step 102.

In an embodiment, the controller 16 processes the second output at step 112 using command data without context data. For example, in an embodiment, if the first output met the first threshold at step 106, the controller 16 is configured to process the second output at step 112 without performing steps 108 and 110.

In an embodiment, the controller 16 processes the second output at step 112 using command data and context data. For example, in an embodiment, if the first output did not meet the first threshold at step 106, the controller 16 is configured to process the second output at step 112 after performing steps 108 and 110.

At step 114, the controller 16 processes the command data to determine whether a second threshold has been met. More specifically, the controller 16 determines whether the second threshold has been met by the second output. In an embodiment, the second threshold is met when the controller 16 recognizes at least one word from the second output. In an embodiment, the second threshold is met when the controller 16 recognizes at least one word from the second output which corresponds to a predetermined group of words. In another embodiment, the second threshold is met when the controller 16 recognizes a predetermined number of a plurality of words of the second output (e.g., from a predetermined group of words). In an embodiment, the controller 16 is configured to generate at least one confidence score (e.g., a second confidence score) based on the second output. In an embodiment, the second confidence score is based on a number of recognized words in the second output. In an embodiment, the second confidence score is based on a type of recognized word in the second output. In an embodiment, the second confidence score is based on missing words in the second output. In an embodiment, the second confidence score includes a first numerical value and the second threshold includes a second numerical value, and the controller 16 is configured to determine that the second threshold has been met if the first numerical value is above or below the second numerical value. In an embodiment, the second confidence score is generated based on the controller 16 recognizing one word from the first output (e.g., from a predetermined group of words) and also finding correspondence with a function (e.g., a domain match) at step 110. In an embodiment, the second confidence score is generated based on the controller 16 recognizing particular words or a particular order of words. In an embodiment, the second confidence score is calculated from numerical values based on recognized words and corresponding context data (e.g., functions). In an embodiment, the second confidence score includes an error probability determination. In an embodiment, the second threshold is met if the second confidence score is within a standard deviation of the second threshold (e.g., one standard deviation as determined by user studies). If the second output does not meet the second threshold, the method 100 proceeds to step 120. If the second output meets the second threshold, the method 100 proceeds to step 122 and/or step 126.

At step 116, the controller 16 causes one or more of a plurality of actions. Specifically, the controller 16 causes one or more of steps 118, 120, 122 and/or 126. The controller 16 is configured to cause one or more of steps 118, 120, 122 and/or 126 by directly controlling at least one adjustable vehicle component 20 and/or the audio device 24 according to instructions generated by the controller 16 and/or by sending the instructions to a separate controller of the at least one adjustable vehicle component 20 and/or the audio device 24.

At step 118, the controller 16 causes a first response to be output from the audio device 24. The first response requests that the audible command be repeated. For example, the first response can include an audible response from the audio device 24 to an occupant of the vehicle 12 asking for the audible command to be repeated (e.g., "Can you repeat that?"). In the illustrated embodiment, the controller 16 causes the first response to be output from the audio device 24 after determining that at least one confidence score does not meet the first threshold at step 106. In the illustrated embodiment, the controller 16 causes the first response to be output from the audio device 24 after determining that there is no car function domain match at step 110. In the illustrated embodiment, the controller 16 causes the first response to be output from the audio device 24 after determining that the context data does not correspond to at least a portion of the command data at step 110. In an embodiment, the controller 16 causes the first response to be output from the audio device 24 after determining that occupant data indicates that the audible command was mispronounced (e.g., due to a mouth covering or yawn).

At step 120, the controller 16 causes a second response to be output from the audio device 24. The second response is different from the first response. The second response requests that the audible command be rephrased. For example, the second response can an audible response from the audio device 24 to an occupant of the vehicle 12 asking for the audible command to be rephrased (e.g., "Can you rephrase that?"). In the illustrated embodiment, the controller 16 causes the second response to be output from the audio device 24 after determining that at least one confidence score does not meet the second threshold at step 114. In the illustrated embodiment, the controller 16 causes the second response to be output from the audio device 24 after determining that the first confidence score does not meet the first threshold at step 106 and after determining that a car function domain match exists at step 110. In the illustrated embodiment, the controller 16 causes the second response to be output from the audio device 24 after determining that the context data corresponds to at least a portion of the command data at step 110 but the threshold is not met at step 114. In the illustrated embodiment, the controller 16 causes the second response to be output from the audio device 24 after determining that the first confidence score meets the first threshold at step 106 but the second confidence score does not meet the second threshold at step 114.

At step 122, the controller 16 causes an adjustment of at least one adjustable vehicle component 20. Specifically, the controller 16 causes an adjustment of the at least one adjustable vehicle component 20 corresponding to the audible command. In an embodiment, the adjustment is from the current configuration to a new configuration. In the illustrated embodiment, the controller 16 causes the adjustment of at least one adjustable vehicle component 20 of a plurality of adjustable vehicle components 20 after determining that at least one confidence score meets the second threshold at step 114. In the illustrated embodiment, the controller 16 causes the adjustment of at least one adjustable vehicle component 20 after determining that the first confidence score meets the first threshold at step 106 and the second confidence score meets the second threshold at step 114. In the illustrated embodiment, the controller causes the adjustment of at least one adjustable vehicle component 20 of the plurality of adjustable vehicle components 20 after determining that the context data corresponds to at least a portion of the command data at step 110 and the threshold is met at step 114. In the illustrated embodiment, the controller 16 causes the adjustment of at least one adjustable vehicle component 20 after determining that the first confidence score does not meet the first threshold at step 106 but the second confidence score meets the second threshold at step 114 after a car function domain match has been found at step 110.

At step 124, the controller 16 updates the context data based on the action taken at step 122. For example, if at least one adjustable vehicle component 20 is turned on or off, the status can be updated to "ON" or "OFF". In another example, if at least one adjustable vehicle component 20 is changed to a new configuration, the new configuration can be set as the current configuration.

At step 126, the controller 16 causes a third response to be output from the audio device 24. The third response relates to the at least one adjustable vehicle component 20 being adjusted. For example, in an embodiment, the third response states the name of the at least one adjustable vehicle component 20 being adjusted at step 122 to confirm that the audible command from step 102 has been accurately processed (e.g., "Adjusting seat" or "Adjusting temperature"). In the illustrated embodiment, the controller 16 causes the third response to be output from the audio device 24 after determining that the at least one confidence score meets the second threshold at step 114. In the illustrated embodiment, the controller 16 causes the third response to be output from the audio device 24 after determining that the first confidence score meets the first threshold at step 106 and the second confidence score meets the second threshold at step 114. In the illustrated embodiment, the controller 16 causes the third response to be output from the audio device 24 after determining that the context data corresponds to at least a portion of the command data at step 110 and the threshold is met at step 114. In the illustrated embodiment, the controller 16 causes the third response to be output from the audio device 24 after determining that the first confidence score does not meet the first threshold at step 106 but the second confidence score meets the second threshold at step 114 after a car function domain match has been found at step 110.

The controller 16 can perform step 126 before performing step 122, for example, to inform a vehicle occupant of how the audible command has been interpreted before taking action. Alternatively, the controller 16 can perform step 126 simultaneously with or after performing step 122.

At step 128, the audio device 24 receives an audible user response from an occupant of the vehicle 12. The audible user response indicates whether the audible command has been correctly or incorrectly interpreted. For example, the audible user response can include "No" or "That's not what I said" in response to the third response by the audio device.

At step 130, the controller 16 processes the audible user response. The audible user response can be processed in the same way as the audible command as discussed herein. In an embodiment, the controller 16 performs a sentiment analysis. The controller uses the sentiment analysis to determine whether the audible command has been correctly interpreted. For example, the controller 16 is configured to recognize a word such as "No" or "Not" which indicate that the audible command was not correctly interpreted. In another example, the controller 16 is configured to recognize a change in the occupant's tone of voice or voice level which indicates that the occupant is upset with the way the audible command was interpreted. In an embodiment, the controller 16 is configured to use occupant data (e.g., relating to body language) to determine the occupant's reaction to the way that the audible command has been interpreted.

At step 132, the controller 16 determines whether the audible user response received at step 128 is understood as a negative response. In an embodiment, the controller 16 uses the sentiment analysis at step 130 to determine whether the audible user response received at step 128 is understood as a negative response. If the controller 16 does not understand the audible user response received at step 128, the method 100 returns to step 120. If the controller 16 understands the audible user response received at step 128 as a negative response, the method 100 proceeds to step 134.

At step 134, the controller 16 reverses the action performed at step 122 after determining that the occupant provided a negative response. For example, if the action at step 122 was to turn on an adjustable vehicle component 20, the controller 16 at step 122 turns the adjustable vehicle component back off. In another example, if the action at step 122 was to change an adjustable vehicle component 20 from a first configuration to a second confirmation, the controller at step 122 returns to the first configuration. The controller 16 then updates the reversed configuration as the current configuration at step 124.

At step 136, the controller 16 requests another audible command from an occupant of the vehicle 12, and the method returns to step 102. In an embodiment, the controller 16 also confirms the reversal of the configuration at step 134.

In an embodiment, each time the controller 16 associates a new audible command from an occupant with a specific adjustment of an adjustable vehicle component 20, the learning module 62 is configured to store that new audible command so that it is understood the next time it is spoken. The new audible command can thereafter generate higher confidence scores to meet the first threshold and/or the second threshold. In an embodiment, the new audible command will no longer need to be associated with context data. The new audible command can also be added to the corpus of utterances 54 for use by other vehicles 12.

Figure 3:
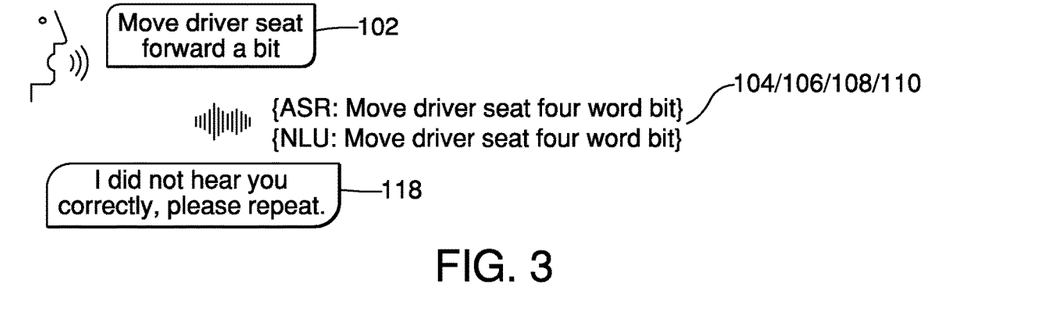
FIG. 3 illustrates an example embodiment of the method of FIG. 2 using example audible commands and responses.
Figure 4:
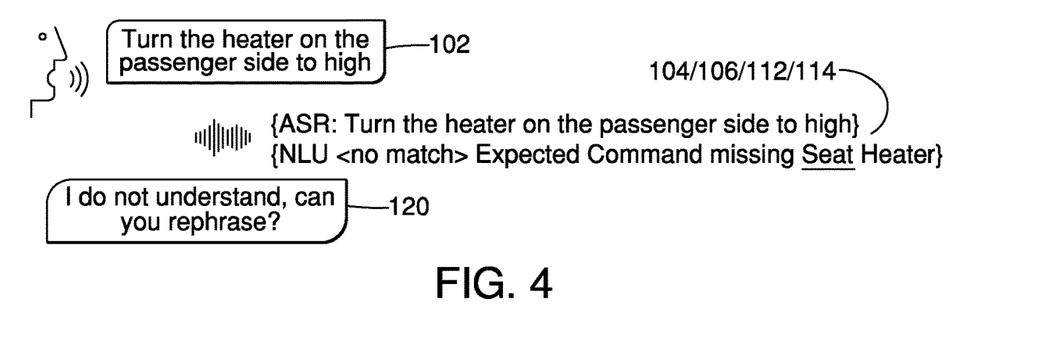
FIG. 4 illustrates another example embodiment of the method of FIG. 2 using example audible commands and responses.
Figure 5:
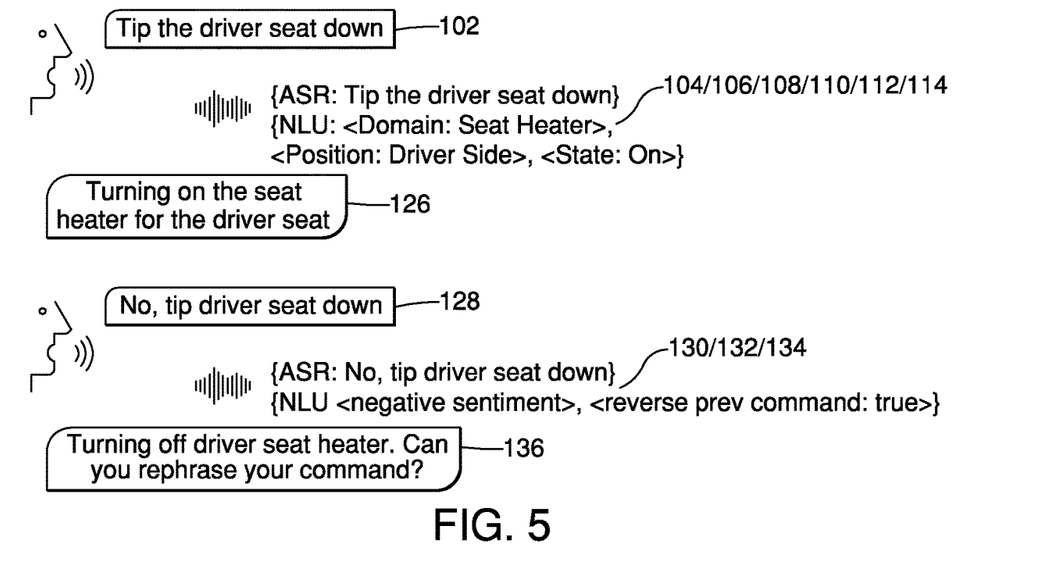
FIG. 5 illustrates yet another example embodiment of the method of FIG. 2 using example audible commands and responses.

FIGS. 3 to 5 illustrate example embodiments of the method 100 using possible audible commands and responses by the audio device 24. It should be understood by those of ordinary skill in the art that FIGS. 3 to 5 are examples only for the purpose of understanding the method 100 and do not limit the method 100.

FIG. 3 illustrates an example embodiment in which the first threshold is not met at step 106 and no context data corresponds to the command data at step 110. In FIG. 3, the audible command received by the audio device 24 at step 102 is "Move driver seat forward a bit." The controller 16 then processes command data from the audible command according to steps 104, 106, 108 and 110 of the method 100. At step 106, the first output (e.g., the ASR output) does not meet the first threshold. At step 110, the controller 16 did not determine that any context data corresponded to the command data. The method therefore proceeds to step 118, where the controller 16 causes the audio device 24 to output a first response in the form of "I did not hear you correctly, please repeat."

FIG. 4 illustrates an example embodiment in which the first threshold is met at step 106 and but the second threshold is not met at step 114. In FIG. 4, the audible command received by the audio device 24 at step 102 is "Turn the heater on the passenger side to high." The controller 16 then processes command data from the audible command according to steps 104, 106, 112 and 114 of the method 100. At step 106, the first output (e.g., the ASR output) meets the first threshold (e.g., due to one or more match of the ASR output). However, at step 114 the second output (e.g., the NLU output) did not meet the second threshold (e.g., due to a missing word in the NLU output). The method 100 therefore proceeds to step 120, where the controller 16 causes the audio device 24 to output a second response in the form of "I did not understand, can you rephrase?"

FIG. 5 illustrates an example embodiment of how the system 10 is configured to correct a misinterpreted audible command. In FIG. 5, the audible command received by the audio device 24 at step 102 is "Tip the driver seat down." The controller 16 then processes command data from the audible command according to steps 104, 106, 108, 110, 112 and 114 of the method 100. At step 106, the first output (e.g., the ASR output) does not meet the first threshold. At step 110, the controller 16 found that context data corresponded to the command data, and at step 114 the controller 16 determined that the second output (e.g., the NLU output) generated at step 112 met the second threshold after retrieving context data corresponding to the terms "driver" and "seat" in the first output at step 110. The method 100 therefore proceeds to step 126, where the controller 16 causes the audio device 24 to output a third response in the form of "Turning on the seat heater for the driver seat." The controller 16 also turns the seat heater on at step 122 and updates the status of the seat heater at step 124. At step 128, the occupant provides an audible user response in the form of "No, tip the driver seat down." At steps 130 and 132, the controller 16 recognizes the negative sentiment of the user (e.g., due to the word "No" or the occupant's body language or tone/level of voice). At step 134, the controller 16 reverses the action taken at step 122 by turning the seat heater back off and again updates the status of the seat heater at step 124. At step 136, the controller 16 causes the audio device 24 to output another request in the form of "Turning off seat heater. Can you rephrase your command?" The method 100 then returns to step 102.

The systems and methods described herein are advantageous for interpreting audible commands and/or eliciting interpretable audible commands from an occupant of the vehicle 12. The systems and methods described herein improve the accuracy of the interpretation, and provide the driver improved feedback and control when an audible command is not understood. It should be understood that various changes and modifications to the methods described herein will be apparent to those skilled in the art and can be made without diminishing the intended advantages.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle 12 equipped as disclosed herein. Accordingly, these terms, as utilized to describe the present invention should be interpreted relative to a vehicle 12 equipped as shown herein.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for adjusting vehicle components based on audible commands received within a vehicle, the system comprising:

a plurality of adjustable vehicle components;
an audio device configured to receive an audible command from an occupant within the vehicle and generate corresponding command data; and
a controller programmed to generate a first confidence score and a second confidence score based on the command data and determine whether the second confidence score meets a second threshold after determining whether the first confidence score meets a first threshold,
the controller further programmed to (i) cause a first response to be output from the audio device after determining that the first confidence score does not meet the first threshold, (ii) cause a second response to be output from the audio device after determining that the second confidence score does not meet the second threshold, the second response different from the first response, and (iii) cause an adjustment of at least one adjustable vehicle component of the plurality of adjustable vehicle components after considering the first threshold and then the second threshold and determining that the first confidence score does not meet the first threshold but the second confidence score meets the second threshold and one or more word matching a function from a narrowed list of functions corresponds to current context data from one or more vehicle sensor related to the function.

2. The system of claim 1, wherein
the first response requests that the audible command be repeated, and
the second response requests that the audible command be rephrased.

3. The system of claim 1, wherein
the at least one adjustable vehicle component includes at least one of a seat, a window, a windshield wiper system, a volume control device, a drive system, a lock, a temperature control system, or a navigation system.

4. The system of claim 1, wherein
the adjustment of the at least one adjustable vehicle component includes at least one of a mechanical adjustment, a volume level adjustment, a temperature adjustment, or a route adjustment.

5. The system of claim 1, wherein
the current context data includes at least one of (i) vehicle component data relating to a current state of at least one adjustable vehicle component of the plurality of adjustable vehicle components, (ii) occupant data relating to a current state of one or more occupant of the vehicle, (iii) weather data relating to a current state of weather, (iv) traffic data relating to a current state of traffic, or (v) road data relating to a current state of one or more road.

6. The system of claim 1, wherein
the controller is configured to generate the second confidence score when the context data corresponds to at least a portion of the command data.

7. The system of claim 1, wherein
the current context data includes first context data from the one or more vehicle sensor relating to a current state of the at least one adjustable vehicle component and second context data from a remote location relating to a current state of weather, traffic or one or more road, and
the controller is programmed to cause the adjustment of the at least one adjustable vehicle component of the plurality of adjustable vehicle components after determining that the function from the narrowed list of functions corresponds to the first context data and the second context data.

8. A system for adjusting vehicle components based on audible commands received within a vehicle, the system comprising:
a plurality of adjustable vehicle components;
an audio device configured to receive an audible command from an occupant within the vehicle and generate corresponding command data; and
a controller programmed to generate a first confidence score and a second confidence score from the audible command and determine whether the second confidence score meets a second threshold after determining whether the first confidence score meets a first threshold,
the controller further programmed to (i) narrow a list of functions based on one or more word from the audible command after determining that the first confidence score does not meet the first threshold, (ii) access current context data from one or more vehicle sensor relating to a current state of the vehicle based on the narrowed list of functions, (iii) determine correspondence between the audible command and at least one adjustable vehicle component of the plurality of adjustable vehicle components based on the current state of the vehicle, and (iv) cause an adjustment of the at least one adjustable vehicle component after determining the correspondence and that the second confidence score meets the second threshold.

9. The system of claim 8, wherein
the current context data includes at least one of (i) vehicle component data relating to a current state of at least one adjustable vehicle component of the plurality of adjustable vehicle components, (ii) occupant data relating to a current state of one or more occupant of the vehicle, (iii) weather data relating to a current state of weather, (iv) traffic data relating to a current state of traffic, or (v) road data relating to a current state of one or more road.

10. The system of claim 8, wherein
the at least one vehicle sensor includes at least one camera directed toward an occupant of the vehicle, the at least one camera configured to generate the current context data.

11. The system of claim 8, wherein
the current context data includes first context data from the one or more vehicle sensor relating to the current state of the vehicle and second context data from a remote location relating to a current state of weather, traffic or one or more road, and
the controller is programmed to determine the correspondence between the audible command and the at least one adjustable vehicle component of the plurality of adjustable vehicle components based on the current state of the vehicle using the first context data from the one or more vehicle sensor and the second context data from the remote location.

12. The system of claim 8, wherein
the first confidence score is generated using the command data and not the current context data,
the second confidence score is generated using the command data and the current context data.

13. The system of claim 8, wherein
the controller is programmed to cause a first response to be output from the audio device after determining that the first confidence score does not meet the first threshold, the controller is programmed to cause a second response to be output from the audio device after determining that the second confidence score does not meet the second threshold.

14. The system of claim 13, wherein
the first response requests that the audible command be repeated, and
the second response requests that the audible command be rephrased.

15. The system of claim 8, wherein
the controller is configured to generate the second confidence score when the context data corresponds to at least a portion of the command data.

16. A system for adjusting vehicle components based on audible commands received within a vehicle, the system comprising:
a plurality of adjustable vehicle components;
an audio device configured to receive an audible command from an occupant within the vehicle and generate corresponding command data; and
a controller programmed to generate a first confidence score and a second confidence score from the audible command, to determine whether the second confidence score meets a second threshold after determining whether the first confidence score meets a first threshold, to receive current context data from one or more vehicle sensor relating to a current state of the vehicle, and to determine correspondence between the current context data and at least a portion of the command data,
the controller further programmed to (i) cause a first response to be output from the audio device after determining that the first confidence score does not meet the first threshold and the current context data does not correspond to at least a portion of the command data, (ii) cause a second response to be output from the audio device after determining that the current context data corresponds to at least a portion of the command data but the second confidence score does not meet the second threshold, and (iii) cause an adjustment of at least one adjustable vehicle component of the plurality of adjustable vehicle components after considering the first threshold and then the second threshold and determining that the first confidence score does not meet the first threshold but the second confidence score meets the second threshold and a function from a narrowed list of functions corresponding to particular current context data from the one or more vehicle sensor corresponds to at least a portion of the command data.

17. The system of claim 16, wherein
the first response requests that the audible command be repeated, and
the second response requests that the audible command be rephrased.

18. The system of claim 16, wherein
the current context data includes at least one of (i) vehicle component data relating to a current state of at least one adjustable vehicle component of the plurality of adjustable vehicle components, (ii) occupant data relating to a current state of one or more occupant of the vehicle, (iii) weather data relating to a current state of weather, (iv) traffic data relating to a current state of traffic, or (v) road data relating to a current state of one or more road.

19. The system of claim 16, wherein
the current context data includes first context data from the one or more vehicle sensor relating to the current state of the at least one adjustable vehicle component and second context data from a remote location relating to a current state of weather, traffic or one or more road, and
the controller is programmed to cause the adjustment of the at least one adjustable vehicle component of the plurality of adjustable vehicle components after determining that the function from the narrowed list of functions corresponds to the first context data and the second context data.

20. The system of claim 16, wherein
the controller is configured to generate the second confidence score when the context data corresponds to at least a portion of the command data.

\* \* \* \* \*